Figure 1:
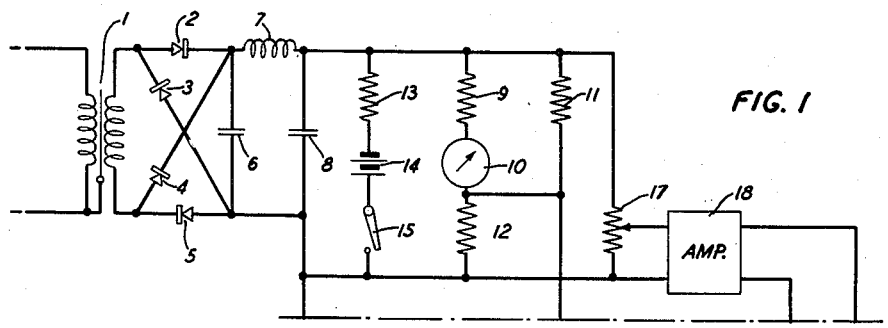

July 25, 1950  G. W. COWLEY ET AL  2,516,756
METER PROTECTION CIRCUIT
Filed Nov. 16, 1948

INVENTORS: G. W. COWLEY
D. E. THOMAS
BY
W. L. Dawson
ATTORNEY

Patented July 25, 1950

2,516,756

UNITED STATES PATENT OFFICE 2,516,756

METER PROTECTION CIRCUIT

Greer W. Cowley, Lincoln Park, N. J., and Donald E. Thomas, New York, N. Y., assignors to Bell Telephone Laboratories, Incorporated, New York, N. Y., a corporation of New York Application November 16, 1948, Serial No. 60,225

4 Claims. (Cl. 171—95)

This invention relates to electrical metering circuits and particularly to means associated with such circuits for changing the sensitivity and protecting the meter element from damage due to abnormal conditions.

The object of the invention is a metering circuit in which, for all abnormal conditions, the sensitivity of the meter is reduced, and the sensitivity of the meter is only restored when normal conditions are established.

A feature of the invention is a protective impedance connected in series with the meter element, which is short-circuited only when normal conditions are established.

Another feature of the invention is relay means operable in response to the voltage applied to the metering circuit to short-circuit the protective impedance only when the voltage applied to the metering circuit is within the normal range of the circuit.

A further feature of the invention is signaling means associated with the relay means and indicating when the voltage applied to the metering circuit is above or below the normal range.

Figure 1A:
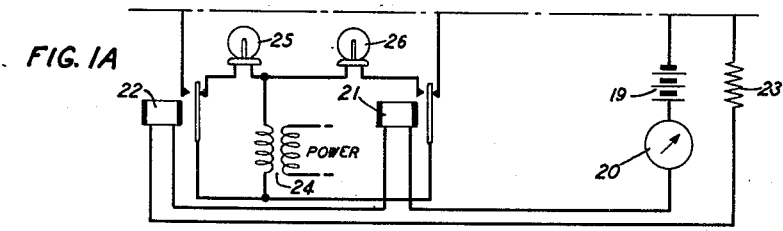
Figure 1B:
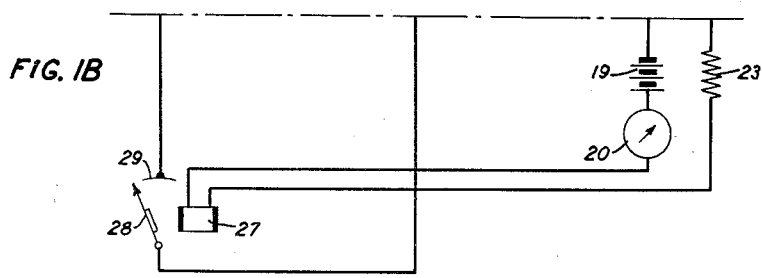

In the drawings:

Fig. 1 discloses a typical metering system embodying the invention;

Fig. 1a shows a two relay control circuit associated with the system of Fig. 1; and Fig. 1b shows a simplified relay control circuit associated with the system of Fig. 1.

The invention is shown embodied in a system for indicating a standard value of alternating current used in measuring the characteristics of circuit elements, such, for example, as circuit elements used at carrier frequencies. The current from the measuring circuit is supplied by a suitable line, such as a coaxial cable, to the primary winding of a suitable transformer 1, which may have the usual electrostatic shield between the windings. The secondary winding of transformer 1 is connected to a full wave rectifier formed of the asymmetrically conductive elements 2, 3, 4, 5. The output of this rectifier is smoothed by the series inductor 7 and shunt capacitor 6, 8. The transformer, rectifier and filter will produce a unidirectional potential across the capacitor 8. If the system is to be used for the measurement of unidirectional potentials, this portion of the circuit may be omitted, and the unidirectional potential supplied directly to the connections from capacitor 8.

The meter 10 may be any suitable sensitive meter, such as a galvanometer or microammeter, and the normal sensitivity may be adjusted by the series and shunt resistors 9, 11. In a typical embodiment of the invention, the meter 10 was a center zero 50–0–50 microammeter, having a resistance of 100 ohms, resistor 9 was 100 ohms, and resistor 11 was 200 ohms. With a meter movement of suitable characteristics, the resistors 9, 11 may be omitted.

The meter 10, with resistors 9, 11 is connected in serial relationship with a protective resistor 12 across the input circuit. The resistance of resistor 12 is selected so that, even with an abnormal voltage from the testing circuit, current in the meter 10 will not be large enough to permanently injure the meter 10. A meter will usually withstand a current of two to four times full scale, thus, in a typical embodiment of the invention, the resistor 12 had a resistance of 5000 ohms.

The metering circuit may conveniently be of the back-biased type in which a predetermined average value of the applied current is balanced against the current from a local source, and the meter 10 indicates only the values of the applied current above and below the average value. The local source 14 may be connected through resistor 13 and switch 15 to the meter circuit to oppose the current therein. With the typical values given hereinabove, the source 14 may be 1.5 volts, and the resistor 13 say 300 ohms. When used as a null indicator in a circuit supplying unidirectional potentials, the biasing elements 13, 14, 15 may be omitted.

A potential divider 17 is connected across the meter circuit and to the input circuit of an amplifier 18, which may be of the type described in an article "Sensitive D. C. Amplifier With A. C. Operation," by S. E. Miller, Electronics, November 1941, page 27, or any other high gain direct current amplifier. As this Miller amplifier has an even number of stages, when the voltage applied to the input circuit of the amplifier is positive, the output current is small, and when the voltage applied to the input circuit is negative, the output current is large. The output circuit of amplifier 18 is connected through the anode battery 19, meter 20, windings of relays 21, 22 and resistor 23. In a typical embodiment of the invention, relay 21 operated on 9.5 milliamperes and released on 7 milliamperes; while relay 22 operated on 5 milliamperes and released on 3.5 milliamperes. The break spring of relay 21 is connected to the upper end of resistor 12, the make spring of relay 22 is connected to the lower end of resistor 12, and the armature springs of relays 21, 22 are connected together. When relay 21 is released and relay 22 is operated, resistor 12 is shunted by the relay connections; when relay 21 is operated, or relay 22 is released, the shunt around resistor 12 is opened, and resistor 12 is in series with the meter 10, reducing the sensitivity of the meter circuit and protecting the meter 10 from damage.

Assuming the amplifier 18 has a maximum output current of, say, ten milliamperes, then, with switch 15 open and no signal voltages applied, resistor 23 is selected of such value that the output current is about five milliamperes, as shown by meter 20, operating relay 22 and shunting resistor 12. With a larger value of signal voltage than normal applied to transformer 1 and with switch 15 closed, the voltage across the meter circuit will be positive, reducing the negative bias of the input circuit of amplifier 18 and producing a small value of output current. By adjustment of the potential divider 17, the output current may be made small enough to release relays 21 and 22, removing the shunt from resistor 12, thus protecting meter 10. With a subnormal value of signal voltage applied to transformer 1 and with switch 15 closed, the voltage across the meter circuit is negative, and the output current of amplifier 18 is increased to such a large value that both relays 21 and 22 are operated removing the shunt from resistor 12, and protecting meter 10. Resistor 12 is in series with the meter circuit at all times when an abnormal condition exists, and is only shunted out when relay 21 is released and relay 22 is operated, with the typical values given, when the output current of amplifier 18 is between 7 and 3.5 milliamperes.

With resistor 12 unshunted, the voltage applied to potentiometer 17 is the voltage drop across the combination of resistors 9, 11 and meter 10 in series with resistor 12; while, with resistor 12 shunted the voltage applied to potentiometer 17 is the voltage drop across the combination of resistors 9, 11 and meter 10. With a large positive signal voltage applied to the system, the voltage drop across resistors 9, 11, 12 and meter 10 is applied to potentiometer 17, the output current is small and relays 21, 22 are released. When the signal voltage decreases to the upper limit of the normal range, the output current increases and operates relay 22, shunting resistor 12. With resistor 12 shunted, the voltage applied to potentiometer 17 is only the voltage drop across resistors 9, 11 and meter 10. The sudden diminution in the positive voltage applied to potentiometer 17 causes a corresponding increase in the output current, increasing the current in relay 22 to give positive operation without any chatter. When the signal voltage decreases below the lower limit of the normal range, the output current will increase until relay 21 operates, removing the shunt from resistor 12, increasing the negative voltage supplied to potentiometer 17, and further increasing the output current. Thus, when relays 21 or 22 operate or release, the change produced in the voltage applied to potentiometer 17 is always such as to aid the operation, or release, of the relay, thus producing positive operation without chatter.

The break contact of relay 22 is connected through the signal lamps 25, 26 to the make contact of relay 21. Lamp 25 may conveniently have a red lamp cap and lamp 26 a green lamp cap. The secondary winding of a low voltage step down transformer 24, energized by the commercial power supply (not shown) is connected from the junction of lamps 25, 26, to the armatures of relays 21, 22. With abnormal positive voltage applied to the input circuit of amplifier 18, producing an output current less than 3.5 milliamperes, relays 21 and 22 are released, the red lamp 25 is lighted, and resistor 12 is in series with the meter 10. With normal voltage, either positive or negative, applied to the input circuit of amplifier 18, producing an output current between 7 and 3.5 mils, relay 21 is released, relay 22 operated, lamps 25 and 26 are out, resistor 12 is shunted and meter 10 has full sensitivity. With abnormal negative voltage applied to the input circuit of amplifier 18, producing an output current more than 9.5 milliamperes, relays 21, 22 are operated, the green lamp 26 is lighted, and resistor 12 is connected in series with the meter.

If the amplifier 18 has an odd number of stages, the same operations of relays 21, 22 may be obtained by suitable changes in the polarities of the applied voltages.

The relay 27 in Fig. 1b may be of the rotary type operable to rotate the contact 28 proportionally to the current supplied to the relay winding. The source of power 19, meter 20, winding of relay 27 and resistor 23 are connected in serial relationship across the output circuit of amplifier 18. The contacts 28, 29 are connected to the ends of resistor 12, Fig. 1. The source 19 and resistor 23 are selected so that contact 28 will make contact with the arcuate contact 29 when the applied potential is just insufficient to produce a minimum deflection of the meter 10, will remain in contact with contact 29 when the applied potential is sufficient to produce a normal deflection of the meter 10, and will break contact with contact 29 when the applied potential is sufficient to produce more than a full scale deflection of meter 10.

What is claimed is:

1. In a measuring system, a sensitive meter, a protective impedance connected in serial relationship with said meter, contact means shunted across said impedance including serially connected make and break contacts, and relay means having an actuating winding connected across said meter and impedance and adapted to close said make contacts for applied potentials in the normal range of said meter, and to open said break contacts for applied potentials below the normal range of said meter, whereby said impedance is shunted by said contacts only when the applied potentials are within the normal range of the meter.

2. In a meter protection circuit, a meter and a protective impedance connected in serial relationship, first and second relays having their windings connected in serial relationship across said meter and impedance, the first relay having a pair of make contacts and the second relay a pair of break contacts, said contacts being connected in serial relationship across said impedance, said first relay being adapted to operate when the applied voltage is in the normal range of the meter, and said second relay being adapted to operate only when the applied voltage is less than the minimum voltage in the normal range of the meter, whereby said impedance is short-circuited by said contacts when the applied voltages are within the normal range of the meter.

3. In a measuring system, a meter and a resistor connected in serial relationship, a pair of normally open contacts and a pair of normally closed contacts connected in serial relationship across said resistor, first and second relays having their actuating windings connected in serial relationship, said first relay having an armature operable to close said open contacts and said second relay having an armature operable to open said closed contacts, an amplifier having an input circuit connected across said meter and resistor and an output circuit, a source of current connected in serial relationship with the windings of said relays across said output circuit, said amplifier and source being so selected that for applied potentials insufficient to produce a minimum deflection of the meter both relays are operated, for applied potentials in the normal range of said meter, the second relay is released, for applied potentials sufficient to cause more than full scale deflection of the meter both relays are released, whereby said resistor is shunted by said contacts only when the applied potentials are sufficient to produce deflections within the range of the meter.

4. In a measuring system, a meter and a resistor connected in serial relationship, a first and a second set of contacts, each set comprising a movable contact, a normally closed contact and a normally open contact, the open and movable contacts of the first set being connected in serial relationship with the movable and closed contacts of the second set across said resistor, a source of power having one terminal connected to said movable contacts, first and second signal lamps connected from the free terminal of said source respectively to the closed contact of the first set and to the open contact of the second set, first and second relays having their actuating windings connected in serial relationship, said relays having armatures respectively operable to move said movable contacts, an amplifier having an input circuit connected across said meter and resistor and an output circuit, a second source of current connected in serial relationship with the windings of said relays across said output circuit, said amplifier and second source being selected so that for applied potentials just insufficient to produce a minimum deflection of the meter the both relays are operated and for applied potentials sufficient to produce more than a full scale deflection of the meter both relays are released.

GREER W. COWLEY.
DONALD E. THOMAS.

REFERENCES CITED

The following references are of record in the file of this patent:

UNITED STATES PATENTS

| Number | Name | Date |
|---|---|---|
| 1,632,050 | Wennemer | June 14, 1927 |
| 2,218,629 | Swart | Oct. 22, 1940 |

FOREIGN PATENTS

| Number | Country | Date |
|---|---|---|
| 432,366 | Germany | Aug. 3, 1926 |